United States Patent
Guilbert et al.

(10) Patent No.: US 6,899,917 B2
(45) Date of Patent: May 31, 2005

(54) POWDERED EPOXY COMPOSITION

(75) Inventors: Curtis R. Guilbert, Austin, TX (US); Neil L. Hanssen, Round Rock, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 367 days.

(21) Appl. No.: 10/034,534

(22) Filed: Dec. 27, 2001

(65) Prior Publication Data

US 2003/0139506 A1 Jul. 24, 2003

(51) Int. Cl.[7] .............................. B05D 5/12; B05D 3/02; C08L 63/00; H02K 3/30
(52) U.S. Cl. ...................... 427/104; 427/386; 523/400; 525/523; 525/534; 310/179
(58) Field of Search ................................. 427/116, 117, 427/58, 104, 386; 525/523, 534; 568/104; 310/179; 523/400, 440; 428/413

(56) References Cited

U.S. PATENT DOCUMENTS

| | | | |
|---|---|---|---|
| 4,367,318 A | * | 1/1983 | Ishimura ..................... 525/481 |
| 5,418,265 A | | 5/1995 | Matsuzaki et al. |
| 5,708,039 A | * | 1/1998 | Daly et al. ..................... 521/61 |
| 5,747,565 A | | 5/1998 | Ono et al. |
| 6,344,155 B1 | * | 2/2002 | Kitahara et al. ............ 252/502 |

FOREIGN PATENT DOCUMENTS

| | | | |
|---|---|---|---|
| EP | 0943639 A2 | | 9/1999 |
| JP | 07-258384 | | 10/1995 |
| JP | 11-172075 | | 6/1999 |
| JP | 2000 273282 | * | 10/2000 |

OTHER PUBLICATIONS

Caplus, Abstract of JP 2000273282, 2000.*

* cited by examiner

*Primary Examiner*—Michael J. Feely
(74) *Attorney, Agent, or Firm*—Gregg H. Rosenblatt; Yen Tong Florczak

(57) ABSTRACT

The present invention provides for a powdered epoxy composition particularly well suited for coating electrical windings. The composition comprises (a) from about 30 to 40 wt % of at least one crystalline epoxy; (b) from about 10 to 40 wt % of at least one phenolic resole resin; and (c) from about 1 to 40 wt % of at least one multifunctional branched hindered phenol, wherein all weight percentages are based on the total weight of said composition.

20 Claims, No Drawings

POWDERED EPOXY COMPOSITION

TECHNICAL FIELD

The present invention relates to a powdered epoxy composition exhibiting low melt viscosity when applied to a substrate thereby allowing for uniform coatings and for good penetration into small gaps and crevices. In particular, the invention relates to additives in the powdered epoxy composition used to achieve the low melt viscosity.

BACKGROUND

Powdered epoxy coating compositions have many applications. One useful application is in the field of motors. A typical motor can contain many components, e.g., a rotor (or armature) and a stator. It is very common for the rotor and the stator to contain wires, typically copper wires, wound about a part. The wound wires are commonly referred to as a "winding". Typical motor or coil windings technology requires a protective coating over the electrically insulated metal windings to protect the windings from dust, moisture, and chemicals. In the uncoated state, the insulating materials tend to be porous and moisture absorbent. Motors that have windings with poor or deteriorated protective coatings are susceptible when exposed to high humidity. Often, materials drawn into motor windings during normal use are moisture absorbent. Such materials not only clog areas relied upon for proper motor ventilation, they also may act as receivers of moisture from humid air. Moisture drawn into motor windings in this manner creates paths of current flow to ground. Once this path is developed the carbon trail left behind will continue to conduct until failure occurs.

Some skilled in the art have turned to epoxy coating to protect the metal windings. For example, U.S. Pat. No. 5,747,565 (Ono et al.) discloses an epoxy powder coating composition suitable for use in insulating electric and electronic parts. The patent discloses a composition comprising (A) 100 parts by weight of a mixed epoxy resin having an epoxy equivalent of 800–2000 and including (i) a diglycidyl ether of bisphenol A having an epoxy equivalent of 180–2500 and (ii) a rubber modified epoxy resin having an epoxy equivalent of 180–2500 and obtained by reaction of a diglycidyl ether of bisphenol A with a carboxyl terminated acrylonitrile butadiene copolymer; (B) a mixed curing agent consisting of (i) 0.05 parts by weight of an imidazole compound, (ii) 0.5–10 parts by weight of dicyanodiamide and (iii) 1–10 parts by weight of a dihydrazide of a dibasic carboxylic acid and (C) 50–100 parts by weight of silica.

Japan Kokai 11-172075 discloses an epoxy resin composition comprising (A) at least 60 wt % of a cystalline epoxy resin, (B) a phenolic resin curing agent which can be a Bisphenol A type epoxy, (C) a fused silica powder and (D) at least one type of hardener accelerator such as an imidazole.

Japan Kokai 07-258384 discloses an epoxy resin composition comprising (A) cystalline epoxy resin, (B) a phenolic resin curing agent of a bisphenol A epoxy resin type, (C) a novolak phenolic resin, (D) Bisphenol A, and (E) an imidazole accelerator.

It is known in the art to also use a liquid varnish to coat the windings. A typical process involves trickling the varnish on the winding to coat the metal wires. Such a process tends to be time consuming. Also, varnishes typically contain volatile organic components making them environmentally unfriendly.

While the foregoing technologies may be useful, what is needed in the art is different powdered epoxy compositions that exhibit good adhesion and yet provide good flow characteristics when the composition is applied to a substrate.

SUMMARY

It is believed that this is the first time a multifunctional phenol group, used in the high amount disclosed herein, is used as a viscosity modifier in a powder coating composition.

In brief summary, in one aspect, the present invention pertains to a powdered epoxy composition comprising: (a) from about 30 to 40 wt % of at least one crystalline epoxy resin, (b) from about 10 to 40 wt % of at least one phenolic resole resin; (c) from about 10 to 40 wt % of at least one multifunctional branched hindered phenol. All percentages are based on the total composition weight. Optionally, the composition further includes less than about 1 wt % benzoin, up to about 50 wt % bisphenol A terminated epoxy, and less than about 1 wt % methylimidazole.

The inventive powdered epoxy can be used as a protective coating on any surface. In one application, the powder is applied to a heated substrate. Upon contact with the heated substrate, the powder melts, reacts, and forms a coating. In another application, the powder is first melted and then applied to a substrate. The powder can also be electrostatically charged and the charged powder particles are then attracted to a substrate, which can be subsequently heated. The powdered epoxy is particularly suitable for coating electrical windings in motor coils. In particular, the powdered epoxy can be used to package and encapsulate electric rotors and stators, to consolidate coil windings, and to bond the coils to rotor cores. The powdered epoxy can also be used in bobbin wound wires for transformers. Because of its low melt viscosity, the inventive powdered epoxy can be used as a binder for fibrous substrates. For example, personal computer boards typically start out as a substrate containing intertwined fibers, which can be secured to one another after they are impregnated with the inventive powdered epoxy.

The invention provides for an epoxy coating that has excellent overlap shear, as defined below. Such a property is particularly desirable in motor coils to keep the individual wires in the winding insulated from one another and to minimize the possibility that the wires would detach from the winding itself during use.

Advantageously, the multifunctional branched hindered phenol functions to reduce the powder coating viscosity when it is applied to a heated substrate thereby allowing for better penetration of the coating into small crevices on the substrate. It is also believed that the use of the hindered phenol increases the coating's overlap shear.

When compared to the prior art, the present invention uses considerably less crystalline epoxy resin, which is usually one of the more expensive components in the composition. The economic advantage, when coupled with a short processing time required to apply the powdered epoxy to a motor coil, makes the inventive powdered epoxy composition especially useful in industry.

DETAILED DESCRIPTION

Each component of the inventive composition and the method of making the composition are described in detail below.

In general, the crystalline epoxy resin used herein is a traditional crystalline solid at room temperature (22° to 25°

C.). The crystalline epoxy resin is present from about 25 to 45 wt %, preferably from about 30 to 40 wt %, based on the total weight of the composition. Useful crystalline epoxy resin has an equivalent weight of less than about 130, preferably from about 115 to 125 or a melt viscosity of less than about 5 centipoise, preferably about 2 to 3 centipoise at 150° C. More preferably, the crystalline epoxy resin has an equivalent weight from about 115 to 125 and a melt viscosity of about 2 to 3 centipoise at 150° C. Preferably, the crystalline epoxy resin contains little to no oligomers.

One illustrative and useful crystalline epoxy resin is the hydroquinone type shown in the formula below. Such an epoxy resin has an equivalent weight of about 120 and a melt viscosity of about 3 centipoise at 150° C.

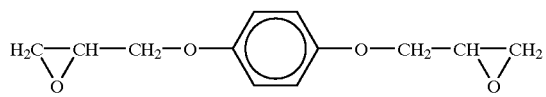

The phenolic resole resin and the multifunctional branched hindered phenol act as curing resins. As used herein, the term "resole" means a condensation product produced by the reaction of phenol and formaldehyde under alkaline conditions. Illustrative suitable phenolic resole resin useful for the practice of the present invention is commercially available from Schenectady International, Schenectady, N.Y. as product number HRJ-1367. This resin is present from about 10 to 40 wt %, preferably from about 15 to 35 wt % based on the total weight of the composition.

As used herein, the term "multifunctional branched hindered phenol" means a phenol selected from the group consisting of trifunctional phenol, tetrafunctional phenol, and combinations thereof. In addition to its function as a curing agent, the multifunctional branched hindered phenol is also a viscosity modifier. Illustrative suitable multifunctional branched hindered phenols include commercially available IRGANOX 1010 (tetrafunctional) from Ciba Speciality Chemicals, Tarrytown, N.Y. and commercially available LOWINOX 1790 (trifunctional) from Great Lakes Chemical Co., Indianapolis, Ind. Such hindered phenols are present from about 5 to 40 wt %, preferably from about 10 to 40 wt %, based on the total composition weight. Thus, it has been discovered that IRGANOX 1010, commonly used as a heat stabilizer at 1% or less, can be used at up to 40 wt % in the inventive composition to reduce melt viscosity. Because IRGANOX 1010 is a tetrafunctional branched hindered phenol, it is believed that it can cure into the inventive composition while not reducing the overlap shear. An added benefit is that IRGANOX 1010 has a very low environmental toxicity and is rated a food-grade material.

The following optional components can be used in the inventive composition. A flow agent, such as benzoin, was added to aid the release of volatile gases when the powdered epoxy is applied to a heated substrate to form a coating. The flow agent also helps to produce coatings with minimal number of voids. The agent additionally aids in the water release of the condensation reaction that occurs with the homopolymerization of the phenolic resole resin. When used, the benzoin is present at 1 wt % or less of the total composition weight.

Bisphenol A terminated epoxy, a polymeric epoxy, is another optional component. If used, it is present up to about 50 wt %, preferably from about 35 to 45 wt % of the total composition.

The epoxy curing resin is also capable of self-curing, i.e., it reacts via homopolymerization during curing of the powder coating. Preferably, a catalyst is used to cause the reaction to progress at a commercially acceptable rate. A preferred catalyst for this invention is 2-methylimidazole, though other members of the imidazole family can be, e.g. 2-ethyl-, propl-, butyl, and the like.

Method of Making

Powdered resins can be made by a high temperature (e.g. >200° F.) extrusion of a mixture of resins and curing agents to obtain a homogeneous mixture. The mixture can then be ground to yield the comminuted product, which can be screened to obtain the desired particle size distribution.

A preferred method of making the inventive composition is to charge the components in a high shear blender equipped with cooling. An illustrative suitable blender is commercially available from Micro-Mill Bel-Art Products, Pequannock, N.J. Preferably, the blender contains a jacket where compressed air (at temperature between 40 to 60°) is used as a coolant. Blending time depends on the final desired particle size and one skilled in the art should take care to choose the appropriate blending time.

The powdered epoxy composition can then be dropped, i.e., using gravity to apply the powder, on a heated substrate. Alternatively, the powdered epoxy can be electrostatically sprayed onto a substrate. One skilled in the art will appreciate that other methods exist for applying the powdered epoxy composition to a substrate.

EXAMPLES

The following examples are provided to illustrate different embodiments and details of the invention. Although the examples serve this purpose, the particular ingredients and amounts used as well as other conditions and details are not to be construed in a manner that would unduly limit the scope of this invention. Unless otherwise specified, all percentages are in weight percent.

TABLE 1

Abbreviations

| | Description | Source |
|---|---|---|
| RSS | crystalline epoxy: RSS 1407 2,2'-{(3,3',5,5'-tetramethyl{1,1'-biphenyl}-4,4'-diyl)bis(oxymethylene)}bis- | Shell Oil Co., Houston, TX |
| RD | crystalline epoxy: resorcinol diepoxy | Dow Chemical Co., Midland, MI |
| D 85 | polymeric epoxy: DEH 85 bisphenol A terminated epoxy | Dow Chemical Co., Midland, MI |
| D 84 | polymeric epoxy: DEH 84 bisphenol A terminated epoxy | Dow Chemical Co., Midland, MI |

TABLE 1-continued

Abbreviations

| | Description | Source |
|---|---|---|
| HRJ | phenolic resole resin: HRJ 1367 butylphenol resole | Schenectady International, Schenectady, NY |
| I 1010 | multifunctional branched hindered phenol: IRGANOX 1010 (tetrafunctional) pentaerytbritol tetrakis(3-(3,5-di-tert-butyl-4-hydroxyphenyl)propionate | Ciba Specialty Chemicals, Tarrytown, NY |
| L 1790 | multifunctional branched hindered phenol: LOWINOX 1790 (trifunctional) (1,3,5-tris(4-tert-butyl-3-hydroxy-2,6 dimethylbenzyl)-1,3,5-triazine-2,4,6-(1H,3H,5H)-trione) | Great Lakes Chemical Corp., Indianapolis, IN |
| CPL | LOWINOX CPL: polymeric sterically hindered phenol | Great Lakes Chemical Corp., Indianapolis, IN |
| A 70 | ANOX 70: difunctional branched hindered phenol 2,2'-Thiodiethylene bis[3-(3,5-di-t-butyl-4-hydroxyphenyl)propionate] | Great Lakes Chemical Corp., Indianapolis, IN |
| 2MI | catalyst: 2-methylimidazole | Borregaard Synthesis, Newburyport, MA |
| BZ | processing aid: benzoin | Akzo Nobel Polymer Chemicals, Chicago, IL |

Test Method: Hot-Plate Gel Time

This test method provides qualitative results. Its advantage is that it is easy to do in a short period of time. For consistency purposes, one person performed the test.

Using a temperature probe, test the surface of a hot plate to ensure that it is about 150° C. Pour 0.2 gram of the powdered epoxy onto the surface of the hot plate. Using a wooden tongue depressor, stir the powder into a circle of about 1 inch (2.54 cm) in diameter. Begin timing when the powder is melted. Using the tongue depressor, move the melted powder back and forth. When the melted powder reaches a distinctive gelled consistency, stop timing. The time interval is the gel time of the powder. Using a razor blade, remove the cured resin from the hot plate. Repeat the test two more times and average the three time readings. The inventive composition should have a gel time of about 60 to 180 seconds at 150° C.

Test Method: Pill Flow

Weigh out 0.5 gram of powdered epoxy. Using a 12 mm die and plunger and an air press, press the weighed powder at 47 psi for 5 seconds to form a pellet. A suitable die, plunger, and air press can be obtained from Janesville Tool & Manufacturing, Inc. (JT&M), Milton, Wis. under the A-1000 Series product number. Make two pellets of the powdered epoxy for each example.

Roughen the length of steel plates (either 9 inch×2 inch or 20.5 inch×5 inch) with #80 grit sandpaper. The type of steel used is mild steel. Clean the roughened steel plate with isopropanol and wipe excess off with cheesecloth. Using gloved hands, place the steel plates in a 302° F. (150° C.) at a 10° incline along the length of the plate. Preheat the plate for 20 minutes at 30220 F.

Using a digital caliper, measure the thickness of the previously made pellets. Place the two pellets, side-by-side, on the preheated, inclined steel plate in the oven. After 20 minutes, remove the metal plate and measure the length of pellet flow. Calculate the percent flow with the following formula:

% Flow=(length of pellet flow−pellet diameter)÷(pellet thickness)

In the above formula, the pellet diameter should be 12 mm because a 12 mm die was used to make the pellets. The inventive composition should have a pill flow of 45% or greater.

Test Method: Overlap Shear Strength

For each sample, prepare two steel bars (100 mm×15 mm×1.15 mm). Mild steel should be used. Roughen one end of each bar with #120 sandpaper, lengthwise. Clean the roughened bar with isopropanol and wipe off excess with cheesecloth. Place all roughened, cleaned bars in aluminum pan. Place this pan in a 200° F. oven to preheat for 20 to 40 minutes.

Place 0.17 gram powdered epoxy into a weigh dish. Make 12 mm pills using air press and 12 mm die and plunger (80 psi, 12 seconds), as described in the Pill Flow test method. Remove a first bar from oven and place in one side of an assembly fixture, which was used for convenience to hold the steel bars in place. Press the pellet into sanded side of this bar. Remove a second bar from oven and place in the assembly fixture. Press the roughened sides of bars together. Clamp the sample together with a Lion #107 clip, and remove from the assembly fixture. Place samples into an aluminum pan and then into a 200° F. oven for 30 minutes. Thereafter, increase the oven temperature to 374° F. (190° C.). Allow samples to cure at this temperature for 1 hour 45 minutes or until completely cured. Remove from oven and allow them to cool at room temperature (22° to 25° C.).

Use an Instron to perform tensile shear test. Three samples of powdered epoxy should be prepared and tested at 180° C. Place samples lengthwise in the Instron jaws. A thermocouple is attached to the surface of the lower jaw. The sample is tested when the thermometer registered a temperature within 0.3° C. of the set point temperature. Three samples were tested and the shear calculations are averaged for each example. The inventive composition should have an overlap shear strength of 50 psi or greater at 180° C.

Examples 1 to 3 and Comparative Examples A to H

Powder epoxy compositions were made by charging the components listed in Table 2, all of which are listed in grams, into a Micro-Mill blender and mixing for 60 seconds. The blender was cooled using compressed air having a temperature of 40° to 50° F. Each example was then tested according to the test methods described above.

As the data in Table 3 indicates, Comparative Example A had low pill flow because the amount of IRGANOX 1010, a tetrafunctional branched hindered phenol, used was too low (2 grams). In Comparative Examples B and C, the overlap shear was too low because the amount of phenolic resole resin used was low and nonexistent respectively. In Comparative Example D, the amount of LOWINOX 1790, a trifunctional branched hindered phenol, was too low (2 grams). In Comparative Example E, the overlap shear values were too low because a non-preferred difunctional branched hindered phenol (Anox 70) was used. In Comparative Example F, the overlap shear was again too low because a non-preferred polymeric sterically hindered phenol (LOWINOX CPL) was used. In Comparative Example G, the gel time was too low because a non-preferred crystalline epoxy resin (RSS 1407) was used. In Comparative Example H, the pill flow was too low because no phenolic resole resin was used.

TABLE 2

Formulation Compositions

| Ex. | RD | RSS | D 85 | D 84 | HRJ | I 1010 | L1790 | A 70 | CPL | 2 MI | BZ |
|---|---|---|---|---|---|---|---|---|---|---|---|
| 1 | 35.0 | 0 | 10.0 | 29.4 | 10.0 | 15.0 | 0 | 0 | 0 | 0 | 0.99 |
| 2 | 35.0 | 0 | 10.0 | 29.4 | 21.8 | 0 | 15.0 | 0 | 0 | 0 | 0.99 |
| 3 | 30.0 | 0 | 0 | 0 | 33.5 | 35.0 | 0 | 0 | 0 | 0 | 0.99 |
| A | 35.0 | 0 | 0 | 39.4 | 23.0 | 2.0 | 0 | 0 | 0 | 0.2 | 0.99 |
| B | 35.0 | 0 | 0 | 39.4 | 5.0 | 20.0 | 0 | 0 | 0 | 0 | 0.99 |
| C | 35.0 | 0 | 0 | 39.4 | 0 | 25.0 | 0 | 0 | 0 | 0 | 0.99 |
| D | 35.0 | 0 | 0 | 39.4 | 21.8 | 0 | 2.0 | 0 | 0 | 0 | 0.99 |
| E | 35.0 | 0 | 0 | 39.4 | 14.1 | 0 | 0 | 10.9 | 0 | 0.2 | 0.99 |
| F | 35.0 | 0 | 0 | 39.4 | 0 | 0 | 0 | 0 | 25.1 | 0 | 0.99 |
| G | 0 | 35.0 | 10.0 | 29.4 | 10.0 | 15.0 | 0 | 0 | 0 | 0 | 0.99 |
| H | 35.0 | 0 | 0 | 65.0 | 0 | 0 | 0 | 0 | 0 | 0.2 | 0 |

TABLE 3

Performance Results

| Ex. | Gel Time at 150° C. (seconds) | Pill Flow (%) | Overlap Shear at 180° C. (psi) |
|---|---|---|---|
| 1 | 71 | 44.3 | 75.1 |
| 2 | 137 | 45.6 | 128.0 |
| 3 | 166 | 45.6 | 153.0 |
| A | 81 | 35.3 | 142.5 |
| B | 73 | 47.1 | 2.1 |
| C | 56 | 45.7 | 29.4 |
| D | 77 | 46.6 | 101.9 |
| E | 69 | 47.0 | 29.5 |
| F | 85 | 45.2 | 19.7 |
| G | >300 | 45.9 | 62.4 |
| H | 45 | 28.7 | 87.4 |

All references cited herein are incorporated by reference, in each reference's entirety.

What is claimed is:

1. A powdered epoxy composition comprising:
   (a) from about 30 to 40 wt % of at least one crystalline epoxy, wherein said crystalline epoxy has the following formula:

(b) from about 10 to 40 wt % of at least one phenolic resole resin; and
   (c) from about 10 to 40 wt % of at least one multifunctional branched hindered phenol, wherein all weight percentages are based on the total weight of said composition.

2. The powdered epoxy composition of claim 1, wherein said crystalline epoxy has an equivalent weight of about 115 to 125.

3. The powdered epoxy composition of claim 1, wherein the phenolic resole resin is butylphenol resole resin.

4. The powdered epoxy composition of claim 1, further comprising:
   less than about 1 wt % benzoin.

5. The powdered epoxy composition of claim 4 further comprising about 35 to 45 wt % bisphenol A terminated epoxy.

6. The powdered epoxy composition of claim 5 having a gel time of about 60 to 180 seconds at about 150° C.

7. The powdered epoxy composition of claim 1 further comprising less than about 1 wt % catalyst.

8. The powdered epoxy composition claim 7, wherein said catalyst is 2-methylimidazole.

9. The powdered epoxy composition of claim 1, wherein said crystalline epoxy resin has a melt viscosity of less than about 5 centipoise at about 150° C.

10. An epoxy coating comprising the reaction product of:
    (a) from about 30 to 40 wt % of at least one crystalline epoxy, wherein said crystalline epoxy has the following formula:

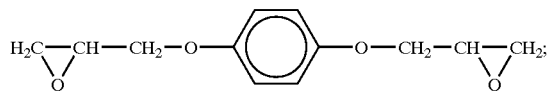

(b) from about 10 to 40 wt % of at least one phenolic resole resin;
    (c) from about 10 to 40 wt % of at least one multifunctional branched hindered phenol; and
    (d) less than about 1 wt % benzoin, wherein all weight percentages are based on the total weight of said composition.

11. The epoxy coating of claim 10, wherein said reaction product further comprises about 35 to 45 wt % bisphenol A terminated epoxy.

12. The epoxy coating of claim 10 having an overlap shear at 180° C. of 50 psi or greater.

13. The epoxy coating of claim 10, wherein said phenolic resole resin is butylphenol resole resin.

14. A method of coating electrical windings, said method comprising the steps of:
    (a) providing a powdered epoxy composition comprising:
        (i) from about 30 to 40 wt % of at least one crystalline epoxy; (ii) from about 10 to 40 wt % of at least one phenolic resole resin; (iii) from about 10 to 40 wt % of at least one multifunctional branched hindered phenol, and (iv) less than about 1 wt % benzoin;

(b) providing an electrical winding;

(c) heating said electrical winding to at least about 150° C.; and (d) applying said powdered epoxy composition to said heated electrical winding.

15. The method of claim 14 further comprising rotating said electrical winding during step (d).

16. The method of claim 14, wherein said crystalline epoxy has the following formula:

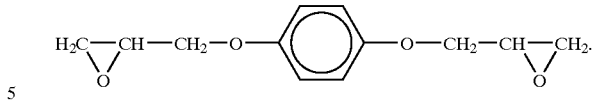

17. The method of claim 14, wherein said phenolic resole resin is butylphenol resole resin.

18. The method of claim 14, wherein said powdered epoxy composition further comprises less than about 1 wt % catalyst.

19. The method of claim 18, wherein said catalyst is 2-methylimidazole.

20. The method of claim 14, wherein said crystalline epoxy resin has a melt viscosity of less than about 5 centipoise at about 150° C.

* * * * *

UNITED STATES PATENT AND TRADEMARK OFFICE
CERTIFICATE OF CORRECTION

PATENT NO. : 6,899,917 B2
DATED : May 31, 2005
INVENTOR(S) : Guilbert, Curtis R.

It is certified that error appears in the above-identified patent and that said Letters Patent is hereby corrected as shown below:

Column 5,
Line 55, delete "30220 F" and insert -- 302º F -- therefor.

Column 8,
Line 35, after "composition" insert -- of --.

Signed and Sealed this

Thirteenth Day of September, 2005

JON W. DUDAS
*Director of the United States Patent and Trademark Office*